(12) United States Patent
Rehm

(10) Patent No.: US 6,445,535 B1
(45) Date of Patent: Sep. 3, 2002

(54) DISK DRIVE WITH SPINDLE MOTOR AND ELECTRICAL CONNECTION ARRANGEMENT

(75) Inventor: Thilo Rehm, Villingen-Schwenningen (DE)

(73) Assignee: Precision Motors Deutsche Minebea GmbH, Villingen-Schwenningen (DE)

(*) Notice: Subject to any disclaimer, the term of this patent is extended or adjusted under 35 U.S.C. 154(b) by 0 days.

(21) Appl. No.: 09/626,839

(22) Filed: Jul. 27, 2000

(30) Foreign Application Priority Data

Jul. 29, 1999 (DE) .................... 299 13 273 U
May 31, 2000 (DE) .................... 200 09 800 U

(51) Int. Cl.$^7$ .................................... G11B 17/02
(52) U.S. Cl. .................................... 360/99.08
(58) Field of Search .................... 360/99.08, 99.04, 360/98.07; 310/67 R

(56) References Cited

U.S. PATENT DOCUMENTS 5,705,866 A * 1/1998 Oguchi .................... 310/67 R
5,815,345 A * 9/1998 Pelstring et al. .......... 360/99.08
6,005,746 A * 12/1999 Papst .................... 360/98.07

FOREIGN PATENT DOCUMENTS

WO    WO 99/23740    5/1999

* cited by examiner

Primary Examiner—Robert S. Tupper
(74) Attorney, Agent, or Firm—Baker & Daniels

(57) ABSTRACT

The invention relates to a disk drive with spindle motor and electrical connection arrangement, comprising a baseplate, a central shaft, an armature which is mounted rotatably with respect to the baseplate by means of a suitable bearings and on which at least one storage disk is arranged, and a stator-side winding stack provided with coils and attached to the baseplate by means of a winding support, the electrical connection of the coils of the winding stack being effected by means of terminal tags.

The terminal tags simultaneously serve as soldering terminals for the ends of the wires coming from the coils and as contact springs for non-positive spring-loaded connection to corresponding contact lands on the printed circuit board.

18 Claims, 4 Drawing Sheets

DISK DRIVE WITH SPINDLE MOTOR AND ELECTRICAL CONNECTION ARRANGEMENT

The invention relates to a disk drive with spindle motor and electrical connection arrangement according to the introductory part of claim 1. Such spindle motors are used for driving storage disks in hard disk drives.

The spindle motor for driving the storage disk(s), which is arranged on a baseplate of the disk drive and consists of armature and stator, has at least one bearing, fitted on a central shaft, by which the armature is mounted rotatably with respect to the stator. The stator consists of a laminated iron core, or stack, with coils wound on it, which will be called the "winding stack"0 for short, and which is arranged on the baseplate by means of a "winding support", with a concentric air-gap between the winding stack and a ring-shaped permanent magnet fitted inside the armature and preferably encased in an iron yoke. Sequential passage of current through the coils sets up rotating magnetic fields which, in co-operation with the, preferably radially aligned, pole pairs of the permanent magnet, generate the torque required to drive the armature.

The difficulty that arises where disk drives with spindle motors are used for driving storage disks is the electrical connection of the coils, located within the drive and therefore in the "sterile zone", to the printed circuit board, arranged outside the drive. This connection needs to be made easily, reliably, and at low cost. Furthermore, electrical connection to the printed circuit board needs to be done as easily and quickly as possible, while the baseplate leadthrough must be hermetically sealed.

DE 19748150 has disclosed a spindle motor with a connection of the abovementioned kind which permits quick and easy connection and allows the winding stack to be injection-moulded outside the base flange and before electrical connection takes place, whilst affording the requisite insulation and sealing of the electrical connection area.

This is achieved by providing contact pins in or on the winding support, one free end of the pins being formed as a soldering terminal to which the wire ends of the coils of the winding are connected. The other ends of the contact pins pass through an opening in the baseplate and, after the connector has been fitted, can be connected to the springy connection tags or contact springs by methods that are known in themselves.

One drawback of this form of construction is that several electrical connection-points are required: first, between the ends of the winding wires and the ends of the contact pins formed as soldering terminals; second, between the other free ends of the contact pins and the springy connection tags or contact springs; and third, between the springy connection tags or contact springs and the contact lands on the printed circuit board. The printed circuit board, which carries, among other things, the control electronics for driving the spindle motor, is mounted on the back of the baseplate. Whilst assembly of the winding stack into the baseplate is on the whole facilitated, the increase in production costs due to the additional contact pins required is a disadvantage.

A further drawback of this construction is that the increased number of contact-points increases the probability of a defect in this area. Moreover, cold solder joints due to imprecisely-defined and/or varying electrical contact resistance in the contact-points may lead to power losses and hence to variations in the rotational speed of the spindle motor, which may cause errors in the recording or reading of the data on the hard disk.

The problem tackled by the present invention is to develop a spindle motor with electrical connection of the type stated at the outset in a way which fully retains the advantages of DE 19748150, and allows simpler and hence cheaper electrical connection in terms of design, production, assembly and maintenance, and allows faster and more reliable connection in terms of mechanical and electrical malfunctions, and yet still allows the winding stack to be injection-moulded before assembly in the baseplate, and still affords the required insulation and sealing of the baseplate leadthrough area.

In accordance with the invention this problem is solved by the technical teaching of claim 1.

The key feature of the invention is that at least one terminal tag arranged in or on the winding support is formed at one free end in the region of the coils as a soldering terminal for making a permanent electrical connection between the wires of the coils and the tag, and is formed at its other free end as a contact spring exerting the necessary contact force for good electrical contact to corresponding contact lands on a printed circuit board.

Here "soldering terminal"0 signifies that a mechanically stable electrical conductor is presented which is constituted of a suitable material, and has a suitable surface, for a sound soldered joint.

This yields the advantage that the wire ends of the coils of the winding stack can be connected to the terminal tags prior to the final assembly of the spindle motor. Furthermore, the winding stack bonded to its terminal tags can be completely injection-moulded without hampering or impairing the subsequent connecting to the printed circuit board.

A further advantage is that the connecting of the wire ends of the coils to the respective terminal tags can be fully mechanized. In a first step, the wire ends of the coils are wound round the tags by machine, and in a second step these contact-points can then be connected e.g. by machine soldering.

Another major advantage of the invention is that by incorporating the terminal tags into the winding support, on the one hand it is possible to dispense with the special connector serving as holder for the terminal tags, and on the other hand the contact pins used in the state of the art for connecting the coil wire ends of the winding to the contact springs are also no longer required.

The smaller number of components means that manufacturing and assembly costs are reduced, while time-consuming and cost-intensive hand soldering for making the electrical connections between contact pins and contact springs is eliminated.

This brings the further advantage that the risk of the occurrence of cold solder joints is considerably reduced.

In accordance with the present invention, the cross-section of the springy terminal tags or contact springs in or on the winding support is preferably rectangular at least in partial regions, which substantially determines the location of the electrical contact-points between the terminal tags and the control electronics, and prevents the tags from warping with respect to the winding support and/or the contact lands on the printed circuit board.

The terminal tags may be at least partly axially displaceable in or on the winding support, the axial displacement being limited by the provision of an axial stop. This stop may be provided on the terminal tag e.g. in the form of a radial collar which abuts against the upper side of the winding support. The stop may be formed on the terminal tag for example by stamping or upsetting. In this case the terminal tag must be inserted through the winding support from above in the course of assembly.

Terminal tags with a rectangular cross-section extending over their entire length are preferred.

The terminal tags may extend through the winding support in the axial and/or radial direction, or, in another embodiment, be fixed to the outer shell of the winding support.

In a preferred embodiment, the terminal tags are arranged on the inside, i.e. in the region between winding stack and shaft.

Further advantageous features and embodiments of the invention are the subject-matter of the dependent claims.

The invention will now be described in detail with reference to several drawings illustrating ways of carrying out the invention. Further features and advantages of the invention will become apparent from the drawings and the description thereof.

IN THE DRAWINGS

Figure 1:
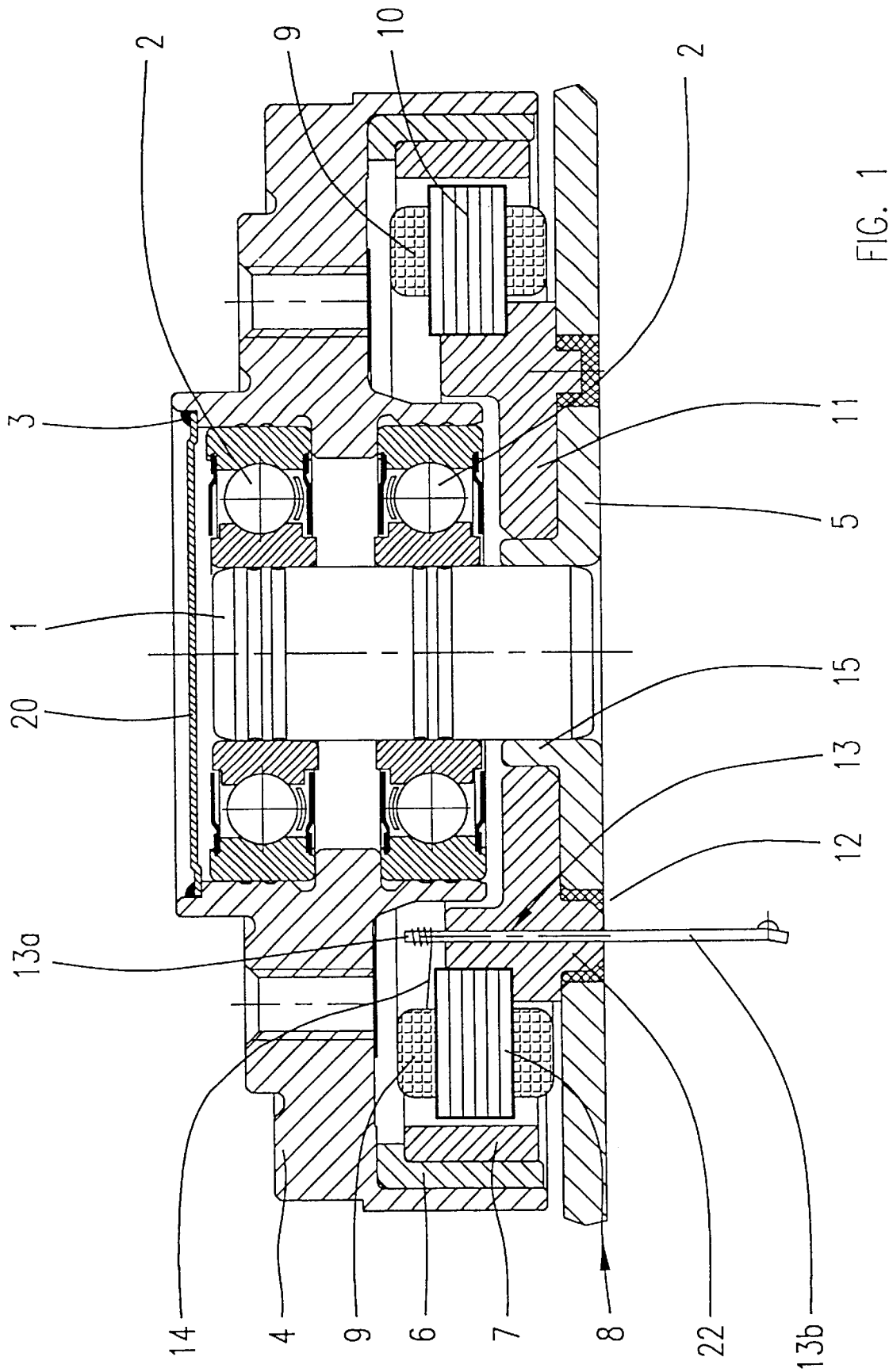
FIG. 1 shows a section through a spindle motor for hard disk drives with electrical connection according to the invention with contact spring led out of the baseplate vertically.

A section through a spindle motor with an electrical connection arrangement according to the invention for a hard disk drive for driving storage disks is shown in FIG. 1.

The armature 4 is mounted rotatably on the stator-side shaft 1 by means of the bearing 2 arranged on the shaft 1; the outer rings of the bearing 2 are connected fixedly in rotation to the armature 4. A cover 20 centrally affixed to the armature 4 and provided with a peripheral seal 3 protects the "sterile space" 0 of the hard disk drive from contamination, particularly in the form of lubricant, that might originate from the bearing 2.

The ring magnet 7 encased in a sleeve-form iron yoke 6 is arranged concentrically inside the armature 4, with clearance from the winding stack 8. The iron yoke 6 and ring magnet 7 are connected fixedly in rotation to the armature 4.

Terminal tags 13 are attached to the winding support 11 so that they pass through the winding support essentially in the axial direction and project from the winding support both above, in proximity to the coil wire ends 14, and below, in the region of the baseplate 5. The upper part of the terminal tag 13 projecting from the winding support 11 is formed as a soldering terminal 13a preferably with a rectangular cross-section and serves to connect the wire ends 14 of the coils 9 of the winding stack 8 with an electrically conducting connection. The lower part of the terminal tags 13 projecting from the winding support 11 is formed as a contact spring 13b likewise preferably with a rectangular cross-section, and serves to make spring-loaded non-positive contact with corresponding contact lands, for example in the form of plated-through breaks or holes on the printed circuit board, which is not shown in the drawing. The terminal tags 13 are led through a more or less axial projection 22 of the winding support 11 which serves both to insulate the terminal tags 13 from the baseplate 5 and also, by affording an increased grip, to ensure that the terminal tags 13 are securely guided in the winding support 11 during assembly and during operation of the spindle motor. Accordingly the projection 22 of the winding support 11 is led through a corresponding opening 12 in the baseplate 5 so that the projection 22 is approximately flush with the underside of the baseplate. The projection 22 may act as an anti-rotation lock between the winding support 11 and the baseplate 5.

Thus the non-positive electrical contact made by the lower free ends of the terminal tags 13, formed as contact springs 13b, with corresponding contact lands, and the soldered joint between the coil wire ends 14 and the upper free ends of the terminal tags 13, formed as soldering terminals 13a, establish a continuous electrically conducting connection between the printed circuit board and the winding stack, through which current can be passed sequentially through the coils to generate the torque required to drive the armature.

Figure 2:
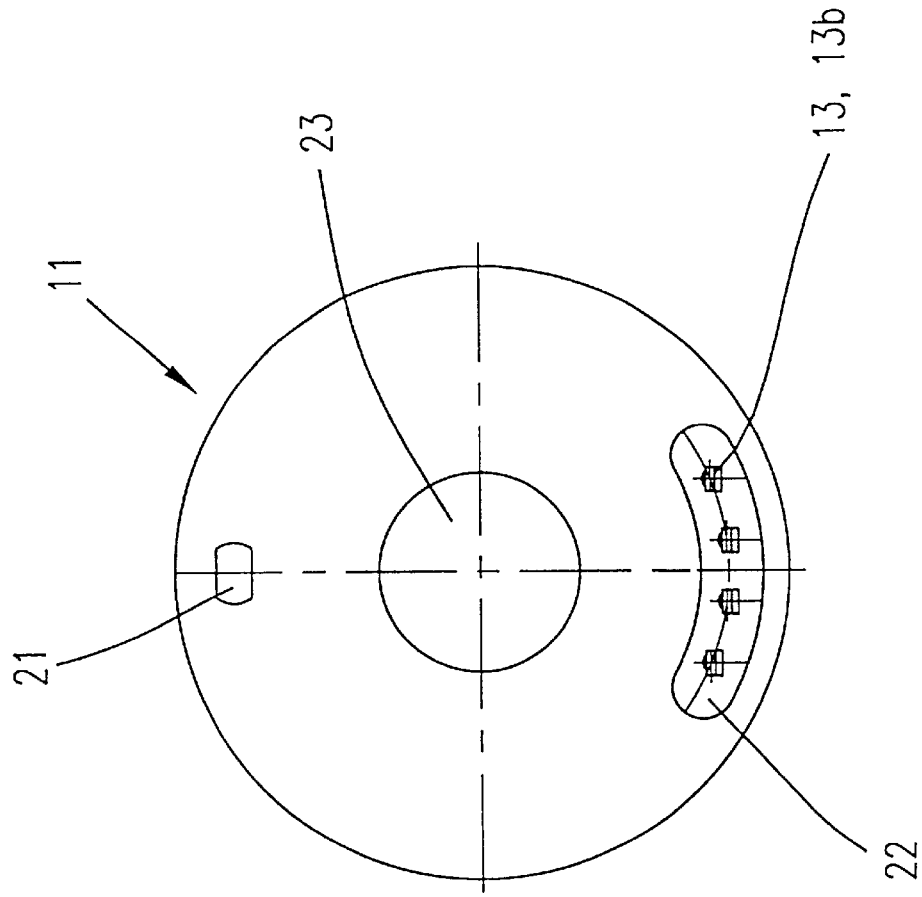
FIG. 2 is a top view of the winding support with terminal tags according to the invention.

FIG. 2 is a bottom view of the winding support 11 with terminal tags 13 or contact springs 13b. The unit is centred on the collar 15 of the baseplate 5 by the central hole 23.

In the lower region, the axially extending banana-shaped projection 22 is seen, through which the terminal tags 13 formed as contact springs 13b are led. Diametrically opposite this projection 22 is another axially extending projection 21 in the form of a stub which in conjunction with a corresponding opening in the baseplate 5 serves as an anti-rotation lock. Alternatively, the projection 21 can be omitted, in which case the projection 22 of the winding support 11 serves as anti-rotation lock.

Figure 3:
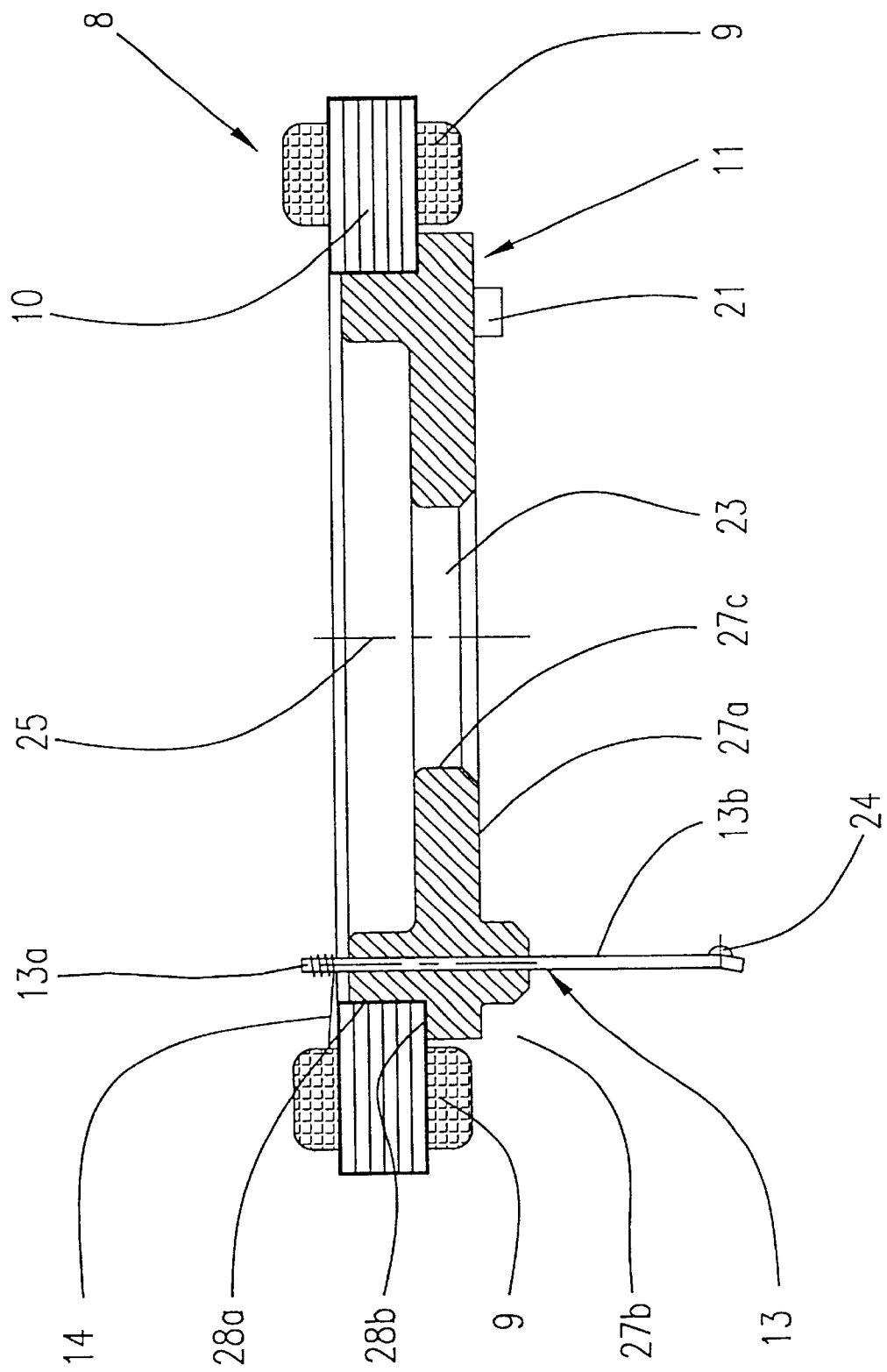
FIG. 3 shows a section through the stator subassembly consisting of winding support, winding stack and terminal tags.

FIG. 3 shows a stator subassembly viewed in section and consisting of winding support 11, winding stack 8 with coils 9 and laminated iron core 10, and terminal tags 13, with contact springs 13b and soldering terminals 13a to which the free wire ends 14 of the coils 9 are soldered.

An important feature of the winding support 11 is its small overall height. The winding support 11 is provided with bearing or seating surfaces 27a, 27b, 27c and 28a, 28b, of which the first group of bearing surfaces 27 are for secure assembly and correctly located mounting [of the winding support 11] in the baseplate 5, while the second group of bearing surfaces 28 enable the winding stack 8 to be positioned and fixed in the correct location on the winding support 11.

To ensure that the connection with the printed circuit board is gastight and will therefore remain free from oxidation and corrosion, it is necessary to achieve the highest possible pressure per unit of area between the surfaces in contact. With this in mind, the ends of the contact springs 13b are formed into bosses 24 offering a smaller support area at the point of contact between the contact spring and the contact land on the printed circuit board. For a given contact force or spring force, the surface pressure according to Hertz is thereby increased, which—according to the theory of electrical contacts—results in gastight and hence corrosion-proof electrical contact.

Instead of being formed into bosses, the ends of the contact springs 13b may for example be formed into ball or pyramid shapes. Alternatively, a V-shaped bend or a simple short L-shaped bend may be provided.

The contact spring 13b may be compared, in respect of its form, function and constitution, with a leaf spring clamped at one end, an (approximately) rectangular cross-section being preferred on account of its transverse stiffness.

What happens according to the state of the art is that the printed circuit board, with its electronic components assembled on it, is attached underneath the baseplate 5 with a parallel clearance which is determined by the height of the components.

If the surfaces to be electrically connected are incorporated directly, i.e. with no through-plating, into the track layout of the copper lamination on the inside i.e. facing the baseplate, the contact lands are no longer perpendicular to the baseplate, but lie parallel with the baseplate. To obtain non-positive electrical contact with these parallel contact lands, the lower free ends of the terminal tags 13 must be bent radially inwards or outwards.

Figure 4:
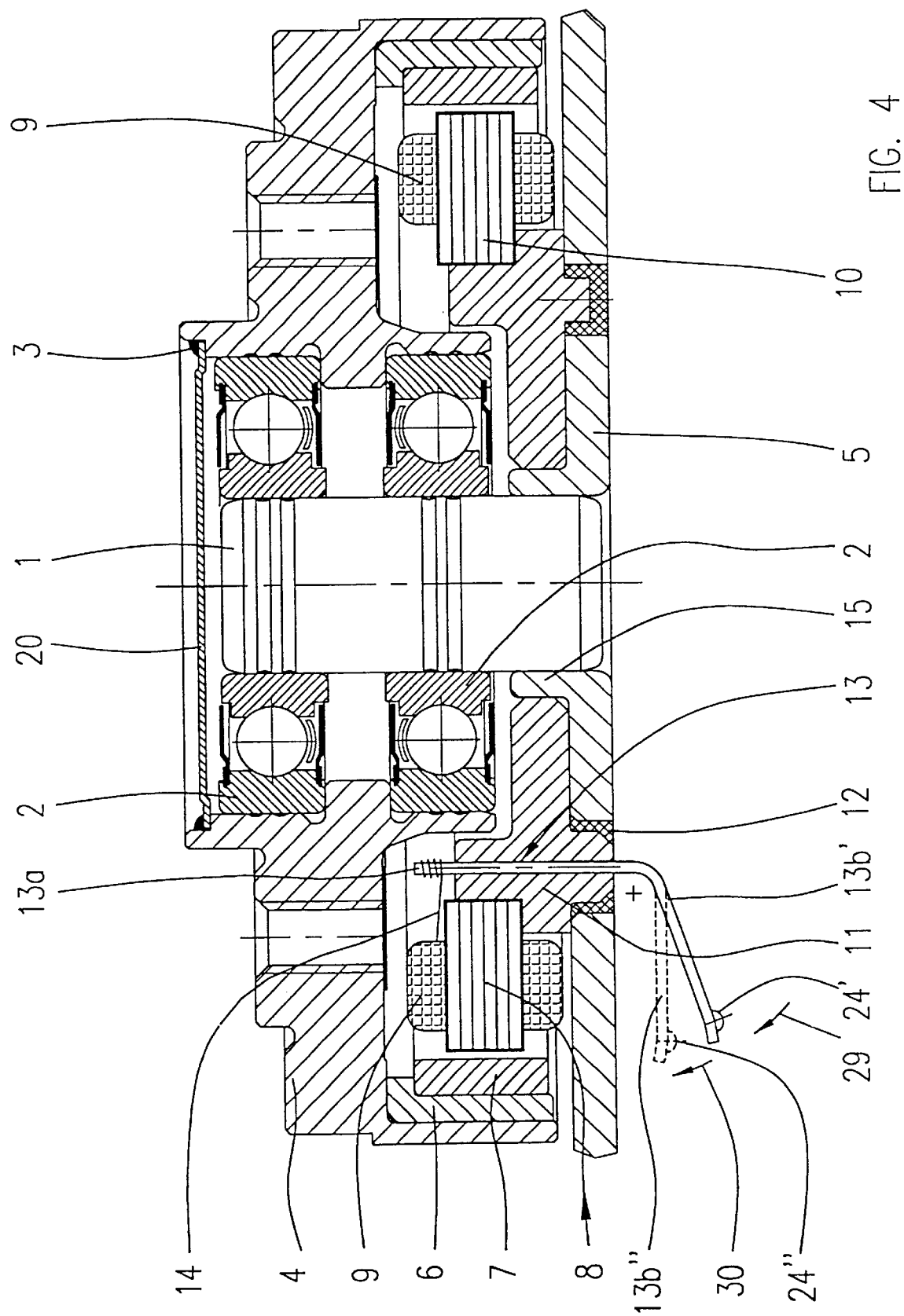
FIG. 4 shows a section through a spindle motor for hard disk drives with electrical connection according to the invention with contact spring led out of the baseplate vertically and then bent over.

FIG. 4 shows a preferred embodiment with terminal tags bent radially outwards. In this case the free end of the terminal tag 13 formed as contact spring 13b' includes an angle of some 15° to 45° with the plane of the baseplate 5, equivalent to an angle of some 45° to 75° with the axis 25 of the winding support 11.

Preferably, the stator subassembly, consisting of winding support 11 with winding stack 8 attached and with coil wire ends 14 bonded or soldered to the terminal tags 13, is assembled with the baseplate 5 in the condition shown in FIG. 3, that is to say with terminal tags 13 sticking straight out. When this assembly takes place, the collar 15 on the baseplate 5 enters the hole 23 and at the same time the axial projection 22 of the winding support 11 is inserted into the corresponding opening 12 in the baseplate 5, and [stator and baseplate] are permanently joined together by procedures known in themselves, such as e.g. pressing or gluing. Then, and only then, the lower free ends of the terminal tags 13 are bent over radially outwards in the direction of the arrow 29 and onward in the direction of the arrow 30 to the position indicated at 13b" in which they are more or less parallel with the underside of the baseplate 5, and ultimately spring back to the position occupied by the contact spring 13b'.

When the printed circuit board is mounted in the course of final assembly, the contact springs 13 are elastically deflected in the direction of the arrow 30 from their initial position indicated at 13b' to the operative position indicated at 13b". The deflection of the contact spring from position 13b' to position 13b" in the course of this bending process, which is largely reversible i.e. within the elastic range, substantially corresponds to the overbend or spring-back resulting from the first deformation of the terminal tags 13, that is from position [13b'] to position [13b"].

Once the printed circuit board has been attached to seating surfaces on the underside of the baseplate which determine the amount of clearance, the free end of the terminal tag 13 formed as contact spring 13b", now in its operative position, therefore extends essentially parallel with the printed circuit board and with the underside of the baseplate 5.

The material and dimensions of the contact spring, and the distance it travels between the positions 13b' and 13b" or in other words the working stroke of the contact boss 24 between the positions 24' and 24", determine the force with which the contact spring bears via the contact boss 24 on the corresponding contact land on the printed circuit board.

The winding support 11 has numerous bearing surfaces for secure attachment to the base flange 5. The hole 23 clasps the collar 15 in the baseplate 5 with the radial bearing surface 27c bearing on the cylindrical outer surface of the collar.

At the same time the horizontal bearing surfaces 27a, 27b bear on the corresponding surface of the baseplate 5. The winding stack 8 is attached to the winding support 11 and located thereon in radial and axial directions by the bearing surfaces 28a and 28b, respectively.

DRAWING LEGEND 1 shaft
2 bearing
3 seal
4 armature
5 baseplate
6 iron yoke
7 ring magnet
8 winding stack
9 coils
10 laminated iron core
11 winding support
12 opening (in base flange 5)
13 terminal tag
13a soldering terminal
13b contact spring, 13b', 13b"
14 [coil wire ends]
15 [collar]
16 [not used]
17 [not used]
18 [not used]
19 [not used]
20 [cover]
21 [projection (stub)]
22 [projection (banana-shaped)]
23 [hole]
24 [contact boss, 24', 24"]
25 [axis]
26 [not used]
27 [bearing surfaces, 27a, 27b, 27c]
28 [bearing surfaces, 28a, 28b]
29 [bending direction]
30 [bending direction]

What is claimed is:

1. Disk drive with spindle motor and electrical connection arrangement, comprising a baseplate (5), a shaft (1), an armature (4) which is mounted rotatably with respect to the baseplate (5) by at least one bearing (2) and on which at least one storage disk is arranged, and a stator-side winding stack (8) provided with coils (9) and attached to the baseplate (5) by means of a winding support (11), characterized in that at least one terminal tag (13) arranged in or on the winding support (11), the terminal tag extending between two oppositely disposed freely extending ends, and wherein the terminal tag is formed at one free end in the region of the coils (9) as a soldering terminal (13a) for making a permanent electrical connection between the wires (14) of the coils and the tag (13), and is formed at its other free end as a contact spring (13b), the contact spring portion of the terminal tag being elastically deflectable and deflection of the contact spring portion of the terminal tag exerting the necessary contact force for effective electrical connection to corresponding contact lands on a printed circuit board.

2. Disk drive with spindle motor according to claim 1, characterized in that the contact spring (13b) of the terminal tag (13) is formed with an essentially rectangular cross-section.

3. Disk drive with spindle motor according to claim 1, characterized in that the ends of the wires (14) coming from the coils (9) are soldered to the terminal tags (13) formed as soldering terminals (13a).

4. Disk drive with spindle motor according to claim 1, characterized in that the terminal tags (13) are displaceably arranged in or on the winding support (11).

5. Disk drive with spindle motor according to claim 4, characterized in that at least one axial displacement lock is present on at least one of the terminal tags (13).

6. Disk drive with spindle motor according to claim 4, characterized in that the winding stack (8) with coils (9) together with the winding support (11), the terminal tags (13) and the coil wires (14) soldered to the soldering terminals (13a) is at least partly covered with, or embedded in, a plastic injection-moulding compound.

7. Disk drive with spindle motor according to claim 1, characterized in that at least one axial displacement lock is present on at least one of the terminal tags (13).

8. Disk drive with spindle motor according to claim 7, characterized in that the winding stack (8) with coils (9) together with the winding support (11), the terminal tags (13) and the coil wires (14) soldered to the soldering terminals (13a) is at least partly covered with, or embedded in, a plastic injection-moulding compound.

9. Disk drive with spindle motor according to claim 1, characterized in that the winding stack (8) with coils (9) together with the winding support (11), the terminal tags (13) and the coil wires (14) soldered to the soldering terminals (13a) is at least partly covered with, or embedded in, a plastic injection-moulding compound.

10. Disk drive with spindle motor according to claim 1, characterized in that the ends of the wires (14) coming from the coils (9) are soldered to the terminal tags (13) formed as soldering terminals (13a).

11. Disk drive with spindle motor according to claim 1, characterized in that the terminal tags (13) are displaceably arranged in or on the winding support (11).

12. Disk drive with spindle motor and electrical connection arrangement, comprising a baseplate (5), a shaft (1), an armature (4) which is mounted rotatably with respect to the baseplate (5) by at least one bearing (2) and on which at least one storage disk is arranged, and a stator-side winding stack (8) provided with coils (9) and attached to the baseplate (5) by means of a winding support (11), characterized in that at least one terminal tag (13) arranged in or on the winding support (11) is formed at one free end in the region of the coils (9) as a soldering terminal (13a) for making a permanent electrical connection between the wires (14) of the coils and the tag (13), and is formed at its other free end as a contact spring (13b) exerting the necessary contact force for effective electrical connection to corresponding contact lands on a printed circuit board and wherein at least one axial projection (21, 22) is provided in or on the winding support (11) and/or in or on the base flange (5), which engages in at least one suitably formed opening in the baseplate (5) and/or in the winding support (11), as an anti-rotation lock.

13. Disk drive with spindle motor according to claim 12, characterized in that the terminal tags (13) are led through the projection (22).

14. Disk drive with spindle motor according to claim 12, characterized in that the winding stack (8) with coils (9) together with the winding support (11), the terminal tags (13) and the coil wires (14) soldered to the soldering terminals (13a) is at least partly covered with, or embedded in, a plastic injection-moulding compound.

15. Disk drive with spindle motor and electrical connection arrangement, comprising a baseplate (5), a shaft (1), an armature (4) which is mounted rotatably with respect to the baseplate (5) by at least one bearing (2) and on which at least one storage disk is arranged, and a stator-side winding stack (8) provided with coils (9) and attached to the baseplate (5) by means of a winding support (11), characterized in that at least one terminal tag (13) arranged in or on the winding support (11) is formed at one free end in the region of the coils (9) as a soldering terminal (13a) for making a permanent electrical connection between the wires (14) of the coils and the tag (13), and is formed at its other free end as a contact spring (13b) exerting the necessary contact force for effective electrical connection to corresponding contact lands on a printed circuit board and wherein the contact spring (13b') of the terminal tag (13) is bent radially outwards.

16. Disk drive with spindle motor according to claim 15, characterized in that the contact spring (13b') of the terminal tag (13) includes an angle of in the region of 15° to 45° with the plane of the baseplate (5).

17. Disk drive with spindle motor and electrical connection arrangement, comprising a baseplate (5), a shaft (1), an armature (4) which is mounted rotatably with respect to the baseplate (5) by at least one bearing (2) and on which at least one storage disk is arranged, and a stator-side winding stack (8) provided with coils (9) and attached to the baseplate (5) by means of a winding support (11), characterized in that at least one terminal tag (13) arranged in or on the winding support (11) is formed at one free end in the region of the coils (9) as a soldering terminal (13a) for making a permanent electrical connection between the wires (14) of the coils and the tag (13), and is formed at its other free end as a contact spring (13b) exerting the necessary contact force for effective electrical connection to corresponding contact lands on a printed circuit board and wherein the terminal tags (13) are displaceably arranged in or on the winding support (11) and at least one axial projection (21, 22) is provided in or on the winding support (11) and/or in or on the base flange (5), which engages in at least one suitably formed opening in the baseplate (5) and/or in the winding support (11), as an anti-rotation lock.

18. Disk drive with spindle motor and electrical connection arrangement, comprising a baseplate (5), a shaft (1), an armature (4) which is mounted rotatably with respect to the baseplate (5) by at least one bearing (2) and on which at least one storage disk is arranged, and a stator-side winding stack (8) provided with coils (9) and attached to the baseplate (5) by means of a winding support (11), characterized in that at least one terminal tag (13) arranged in or on the winding support (11) is formed at one free end in the region of the coils (9) as a soldering terminal (13a) for making a permanent electrical connection between the wires (14) of the coils and the tag (13), and is formed at its other free end as a contact spring (13b) exerting the necessary contact force for effective electrical connection to corresponding contact lands on a printed circuit board and wherein at least one axial displacement lock is present on at least one of the terminal tags (13) and at least one axial projection (21, 22) is provided in or on the winding support (11) and/or in or on the base flange (5), which engages in at least one suitably formed opening in the baseplate (5) and/or in the winding support (11), as an anti-rotation lock.

* * * * *